United States Patent

[11] 3,604,924

| [72] | Inventor | Adrian W. Standaart<br>5 Bonbrook Circle, Winston-Salem, N.C. 27106 |
|---|---|---|
| [21] | Appl. No. | 864,943 |
| [22] | Filed | Sept. 24, 1969 |
| [45] | Patented | Sept. 14, 1971<br>Continuation-in-part of application Ser. No. 828,209, May 27, 1969, now abandoned. |

[54] AUTOMATIC SEDIMENTATION RATE RECORDER
34 Claims, 16 Drawing Figs.

[52] U.S. Cl. .................................................... 346/33 ME,
346/107 A, 356/39
[51] Int. Cl. ........................................................ G01n 33/16
[50] Field of Search ............................................. 346/33 ME,
33 D, 107; 356/39–41, 207, 208

[56] References Cited
UNITED STATES PATENTS

| 2,725,782 | 12/1955 | Worley ........................ | 256/208 X |
| 3,261,256 | 7/1966 | Morton ....................... | 356/40 |
| 3,288,019 | 11/1966 | Blumenfeld .................. | 356/39 |
| 3,422,443 | 1/1969 | Jansen ......................... | 356/39 X |
| 3,474,458 | 10/1969 | Standaart .................... | 356/39 X |

*Primary Examiner*—Ronald L. Wibert
*Assistant Examiner*—F. L. Evans
*Attorney*—Mason, Fenwick & Lawrence

ABSTRACT: An automatic sedimentation rate recording apparatus wherein an elongated container tube containing a fluid sample is placed in a holder adjacent an elongated record forming strip and a high-intensity flashlamp, and a solid state timer circuit times out a selected test period, for example, of 1 hour, activates the flashlamp to produce in the record forming strip an image indicating the level of the sediment in the container tube, and an indicator lamp is activated to signal completion of the test and recording.

INVENTOR
ADRIAN W. STANDAART

BY
Mason, Fenwick & Lawrence
ATTORNEYS

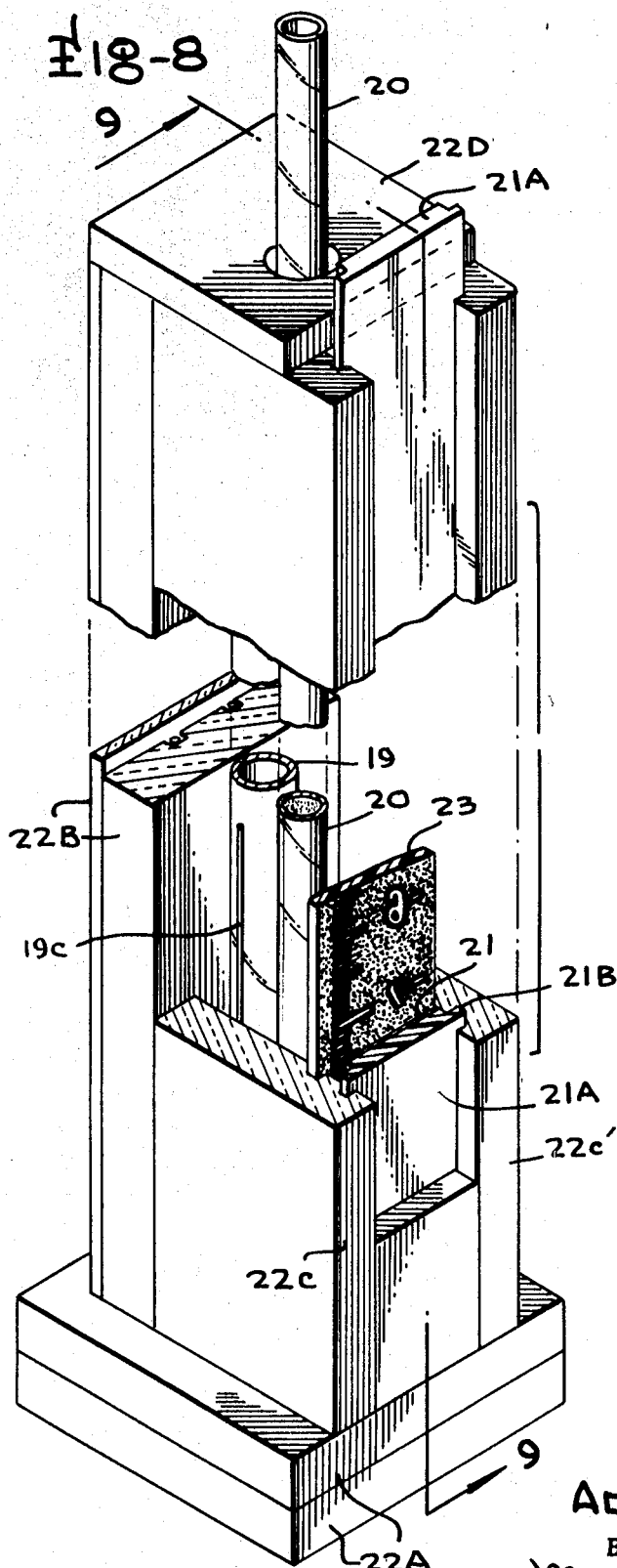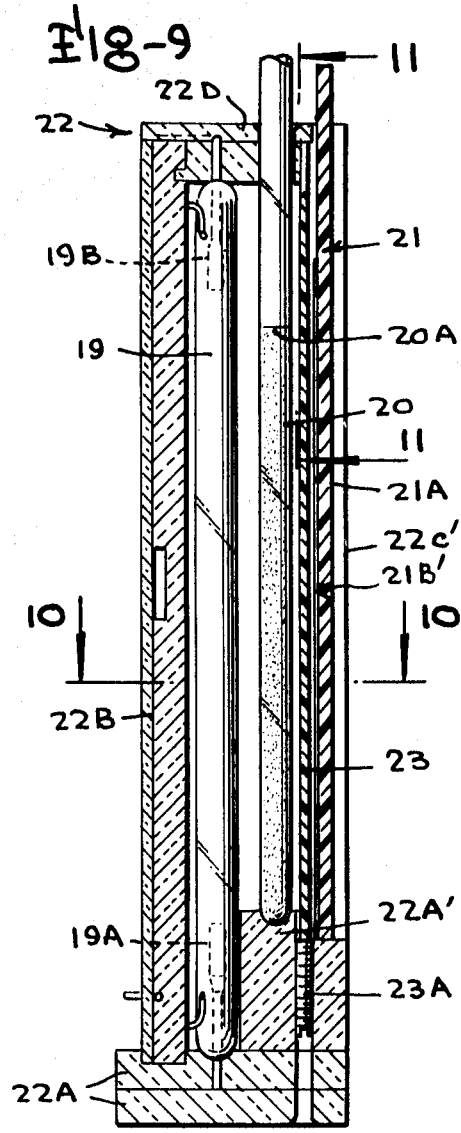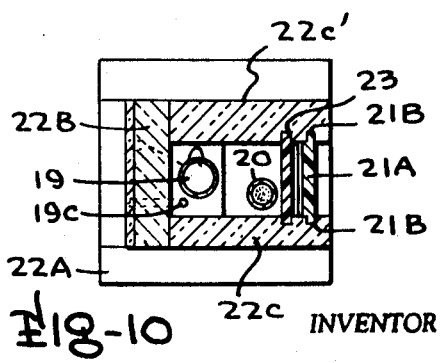

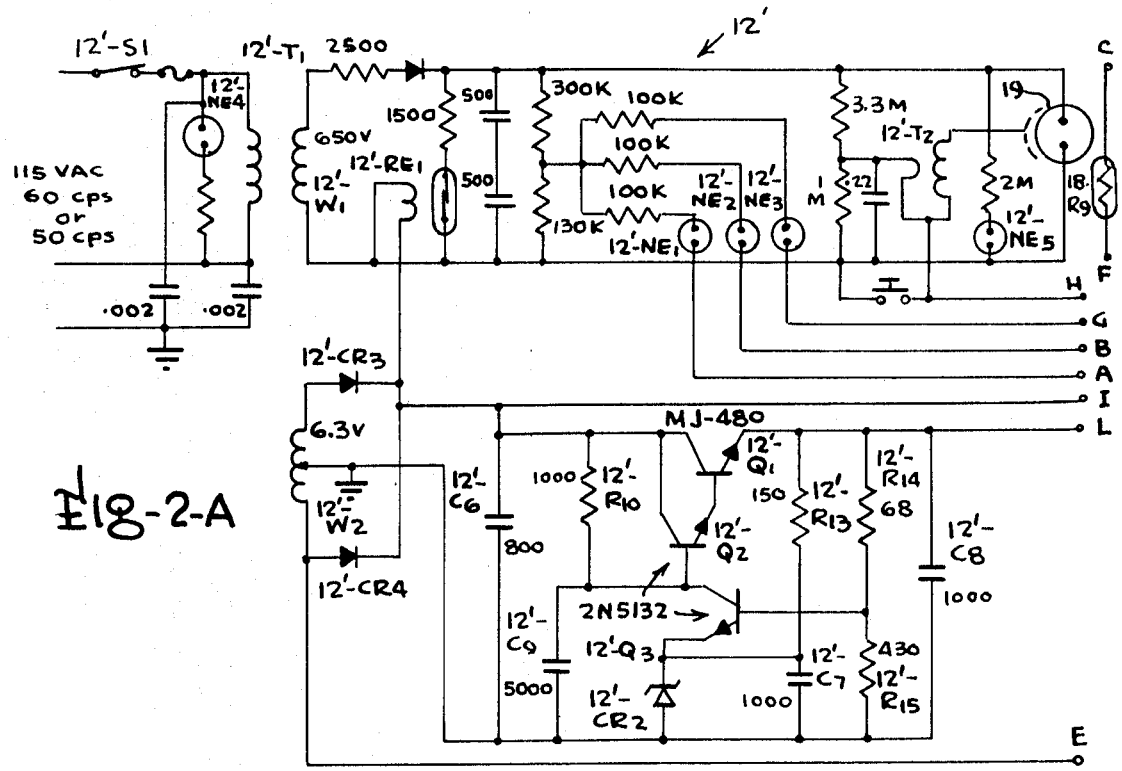

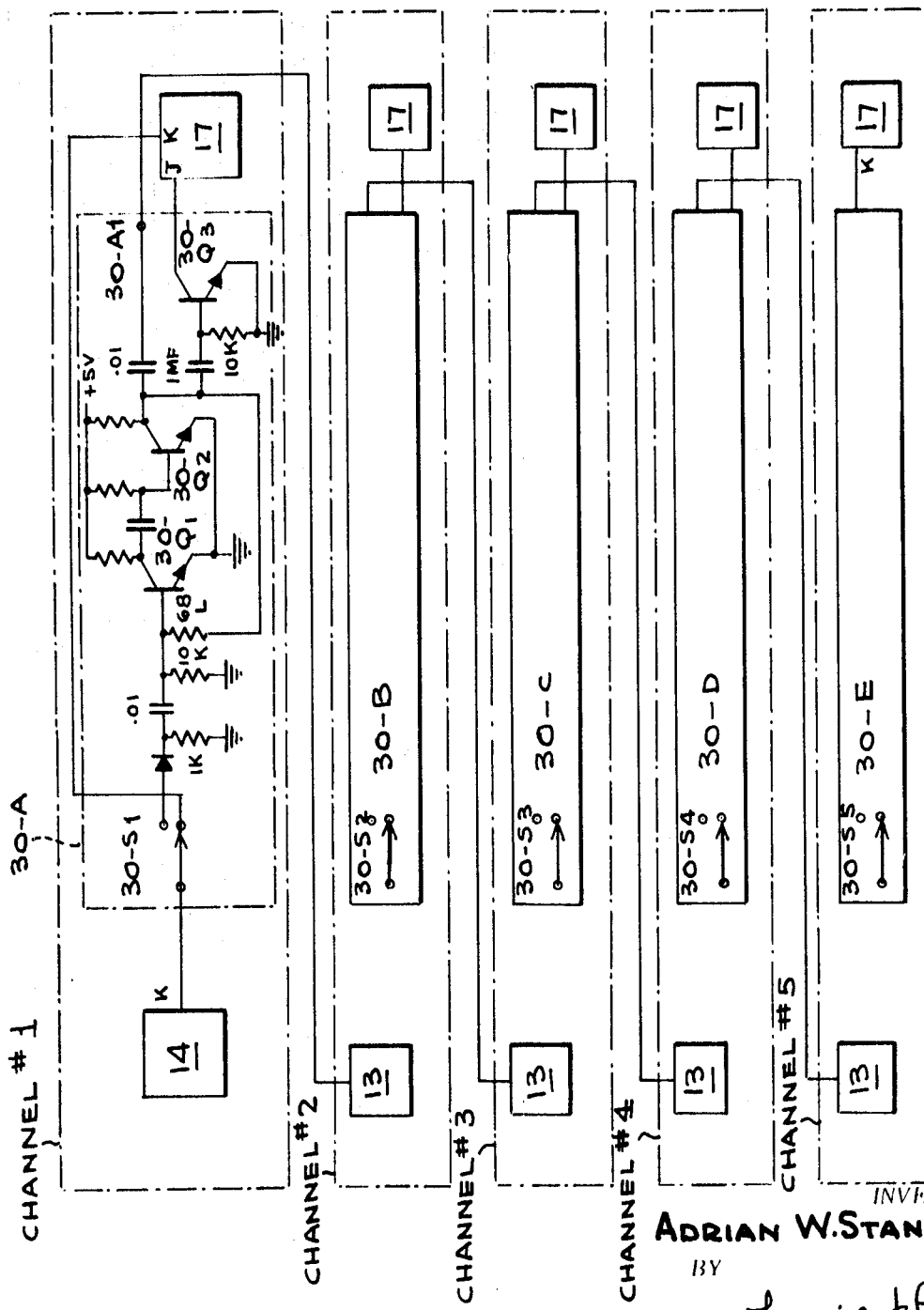

AUTOMATIC SEDIMENTATION RATE RECORDER

This application is a continuation-in-part of my earlier application Ser. No. 828,209 filed May 27, 1969, now abandoned.

BACKGROUND AND OBJECTS OF THE INVENTION

The present invention relates in general to apparatus for automatic timing and recording of certain sedimentation tests to establish the rate of sedimentation in liquids containing opaque matter in suspension, and particularly to apparatus suitable for timing and recording measurement of the sedimentation rate of human blood.

Measurement of the sedimentation rate of human blood is an old and often used test in the laboratory as a test for the presence of inflammation, infection and other conditions. The customary method of measuring the sedimentation rate of human blood has been the so-called Wintrobe method, which is a strictly manual method and is subject to inaccuracies in timing, identification, etc. Basically, in the Wintrobe method, venous blood is drawn into a dry syringe and anticoagulated by a method which preserves the red cell size and shape. This anticoagulated blood is put into a small test tube approximately 115 millimeters long with a 3-millimeter bore and a scale in millimeters etched or printed on the surface of the tube. If the Westergren method is used, the blood is placed in a pipette approximately 300 millimeters long having an approximate 2.5-millimeter inner diameter and a graduated scale over the lower 200-millimeter portion of the pipette. After the contents are well mixed, the tube or pipette is placed in a vertical position, and after an exact 60-minute lapse of time, the scaled tube is read for a determination of the boundary layer location.

Exact timing of the 60-minute lapse of time in which the mixture in the Wintrobe tube or pipette is to stand in a vertical position and reading of the location of the sedimentary boundary layer at exactly 60 minutes after the tube is placed in a vertical position introduces practical problems in the modern laboratory. Technicians busy with performing other tests frequently have difficulty in precisely timing the reading of the location of the boundary layer at exactly 60 minutes following placing of the tube in vertical position. Also, it would be desirable to have a recorded image in a record-forming medium indicative of the location of the sedimentary boundary layer, not only for rechecking the accuracy of the technician's readings, but also for positive patient sample identification.

An object of the present invention, therefore, is the provision of application of apparatus for automatically timing the vertical standing time of a fluid sample in a container tube for which it is designed to obtain a determination of the rate of sedimentation, or the percentage of solids in liquids, and producing a record image at the completion of a selected standing period indicating the sedimentary boundary layer location in the tube.

Another object of the present invention is the provision of a novel apparatus for performing and recording sedimentation rate tests, wherein, at the completion of a standing time of a selected time period, the apparatus is automatically caused to activate a high-intensity flashlamp and produce in a strip of record forming material, which is not adversely effected by normal light intensities in the laboratory and thus does not require special provisions to protect the same against exposure, a record image indicative of the sedimentary boundary layer level of the sample subjected to tests.

Another object of the present invention is the provision of a novel apparatus for automatically timing the standing time of the sample to be subjected to sedimentation rate tests and for automatically producing a record image of the boundary layer location in the sample at the completion of the test period, wherein the automatic timing and record-producing functions are regulated by solid-state electronic circuitry obviating the need for rotary disc-type timers.

Another object of the present invention is the provision of novel apparatus for automatically timing the standing time of a plurality of samples of the same fluid and automatically producing recorded images of the boundary layer locations of the respective samples at timed intervals forming a preselected sequence whereby a sequence-timed sedimentation rate curve can be obtained.

Other objects, advantages, and capabilities of the present invention will become apparent from the following detailed description, taken in conjunction with the accompanying drawings showing a preferred embodiment of the invention.

SUMMARY OF THE INVENTION

The present invention comprises means for supporting in aligned relation at opposite sides of a sample containing tube a high-intensity elongated flash tube and an elongated strip of recording material having a recording layer which responds to short duration, high intensity radiant energy emitted by the flash tube to record an image indicative of the location of the sedimentary boundary layer in the sample tube, together with control circuitry for automatically timing out the proper standing time for the fluid sample, activating the flashlamp to produce a record image of the recording medium, and activating suitable indicator lamps. The circuitry comprises a power supply having means for producing about 880 volts DC across the electrodes of the flash tube, and for producing an appropriate voltage supply to a pulse generator which produces pulses at a selected rate, for example, one pulse per second, to be applied to a counter circuit designed to provide an output pulse after a count of a selected number of the pulses signifying the proper standing time, for example, 3600 one-per-second pulses signifying 1 hour. Reset circuitry is activated by the technical when the sample containing tube is placed in proper position, resetting the counter circuit to zero, and initiating a count of 3600 pulses, indicating the passage of 1 hour. Upon generation of a pulse indicating the 3600-pulse count, circuitry is activated to energize the flash tube to produce a record image and indicator circuits are activated to signify completion of the 1-hour standing time and operation of the flash tube. Means are also provided to signal when the sample tube is not filled to precisely the correct level.

Additionally, circuit means are disclosed for stepping through a timed sequence a plurality of such timing and recording systems, in the form of plural sedimentation rate recording channels, each associated with a separate sample of the same fluid to be tested, to automatically produce records of the sedimentation level of the fluid as preselected intervals to provide information for a sequence-timed sedimentation rate curve.

BRIEF DESCRIPTION OF THE FIGURES

FIG. 2 is a schematic electric diagram of on embodiment of the Power Supply and associated Flash Tube Trigger Circuit:

FIG. 2A is a schematic diagram of another embodiment of a Power Supply for the apparatus;

FIG. 5A is a schematic diagram of another embodiment of the One Second Pulse Generator;

FIG. 8 is a perspective view, with parts broken away, of the holder assembly for the sample container tube to support the same adjacent the flash lamp;

FIGS. 9 and 10 are a vertical and horizontal section view through the holder assembly, taken along the lines 9—9 and 10—10 in FIGS. 8 and 9;

FIGS. 11 and 12 are fragmentary vertical section views along lines 11—11 and 12—12 of FIGS. 9 and 11;

FIG. 14 is a schematic and block diagram of a sequence timed sedimentation rate recording apparatus.

DETAILED DESCRIPTION O A PREFERRED EMBODIMENT

Figure 1:
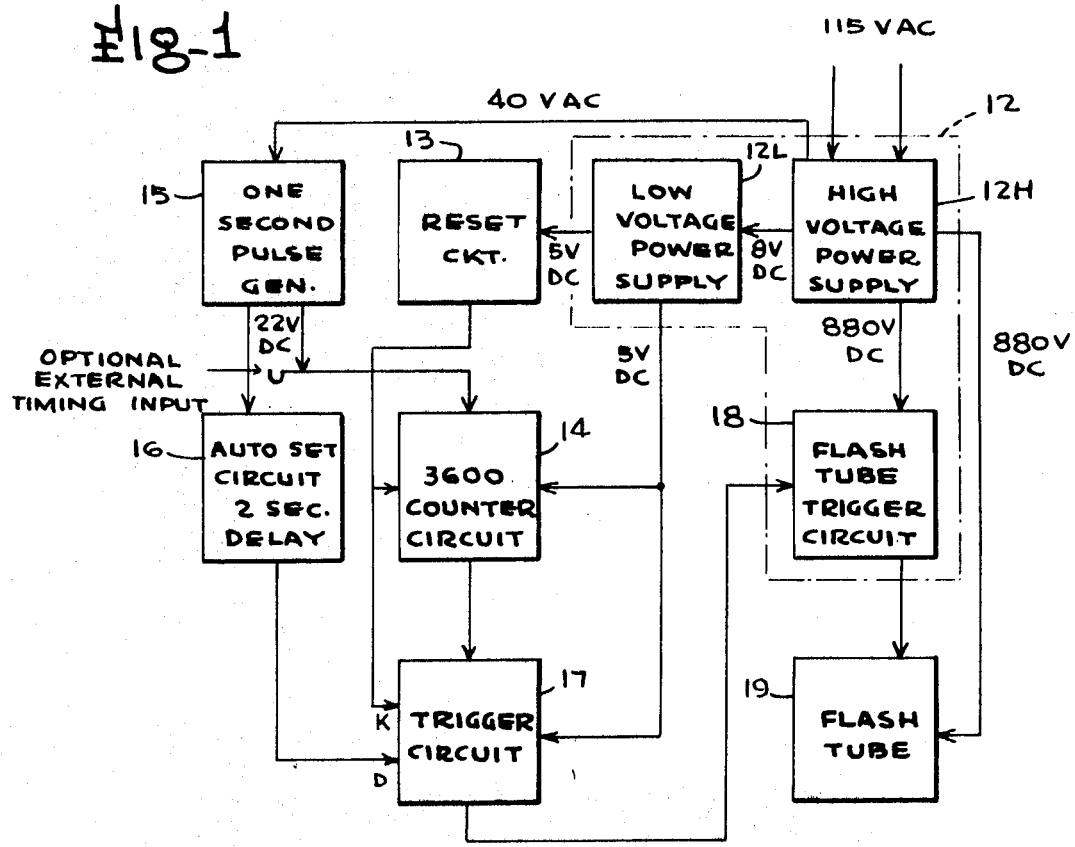
FIG. 1 is a block diagram of apparatus for automatically timing and recording sedimentation rate of a fluid sample in a container tube, embodying the present invention.

Referring to the drawings, wherein like reference characters designate corresponding parts throughout the several figures, and particularly to the block diagram of FIG. 1, the circuitry for effecting automatic timing of the standing time for the fluid sample in the container tube to be subjected to sedimentation rate tests, for example, a human blood sample to undergo a standing time of exactly 60 minutes, comprises a Power Supply 12, shown in FIG. 1 in two blocks indicate by reference characters 12H and 12L designating high-voltage and low-voltage power supply sections, respectively, designed to operate off of a 115-volt AC supply at either 60 cycles (in the United States) of 50 cycles (as occurs in some European countries). The high-voltage section 12H of the Power Supply provides a suitable high voltage, for example, about 880 volts DC, supplied to a Flash Tube Trigger Circuit 18 to operate a high intensity flash tube 19 to be later described in greater detail. The Power Supply 13 also provides a stepped-down AC voltage to a One Second Pulse Generator 15 which produces 1 output pulse each second to be applied to the 3600 Counter Circuit 14 for counting the 1 per second pulses and producing an output pulse at the end of the 1 hour for application to the Trigger Circuit 17. This voltage from the Power Supply 12 to the one Second Pulse Generator 15 is also coupled through the latter to activate an Auto Set Circuit 16 to generate a set pulse a few seconds after power is turned on and apply the same to the Trigger Circuit 17 to set the Trigger Circuit. Additionally, the low voltage section 12L of the Power Supply 12 supplies lower stepped-down and rectified DC voltage supplies to the 3600 Counter Circuit 14 and the Trigger Circuit 17, and to a Reset Circuit 13 having a manual reset switch which, when activated, applies a reset pulse to the 3600 Counter Circuit 14 and the Trigger Circuit 17 to reset these circuits to a zero position and initiate a counting cycle.

The flashlamp or flash tube 19, as is more clearly shown in FIGS. 8, 9 and 10, is an electronic strobe flash tube of the type having an elongated glass envelope filled with an inert gas under pressure, such as xenon, a pair of internal electrodes at the opposite ends thereof, indicated at 19A and 19B in FIG. 9, across which the required high DC voltage from the power supply section 12H is applied, and which additionally includes an external triggering electrode, termed a trigger strip or trigger wire, indicated at 19C in FIGS. 2, 8 and 10, to which a pulse of selected voltage is applied to ionize the flash tube 19 in conduction to produce a very short duration and very high intensity flash, for example, for about one two-thousandth of a second at about 5800° Kelvin or greater and more than 4,000 lumens and a peak intensity at this pulse width of in excess of 3 million lumens. The flash tube 19 is an elongated tube of relatively narrow cross section, having an axial length of at least as great as the axial portion of the sample container tube 20 designed to be occupied by the sample to be subjected to sedimentation rate determination, for example, the portion of the sample or test tube 20 below the fill index mark 20A. The sample container tube will be of a bore size appropriate to the test being conducted, which in the case of sedimentation rate determination on human blood may be the same as that of the conventional Wintrobe tube.

A holder assembly is provided to removably support the sample containing tube 20 in a vertical position in axial parallelism with the flash lamp 19 closely adjacent to the flash lamp and also adjacent to an elongated strip of recording material, indicated generally at 21, having a vertical extent of the fluid containing portion (below the mark 20A) of the tube 20 and disposed on the opposite side of the tube 20 from the flash tube 19. Also, suitable indicia means are provided in the radiation path from the flashlamp 19 through the sample containing tube 20 to the recording strip 21, in the illustrated embodiment between the tube 20 and record strip 21, to provide scale markings correlated with the height of the sample containing tube 20 so that an image of the scale markings is recorded in the region above the boundary layer in the fluid sample upon completion of the selected standing time to permit the location of the boundary layer to be determined from the record obtained in the recording material 21. An example of a suitable holder assembly is indicated generally at 22 in FIGS. 8, 9 and 10, and comprises a base portion 22A, a vertical backwall member 22B, a pair of sidewall members 22C, 22C', and a top member 22D. The members 22A and 22D are provided with suitable vertically aligned sockets or cavities for receiving and supporting the opposite end portions of the electronic strobe flashlamp 19 and the electrodes 19A and 19B thereof, and with channels for lead wire connections to these electrodes as well as to the trigger strip electrode 19C. The top member 22D and a raised block 22A' on the base portion 22A also contain a bore and socket respectively for removably receiving and supporting the sample container tube 20 in axial alignment with the flashlamp 19 at the desired spacing from the flashlamp 19. Preferably, the sample tube 20 is of sufficient axial height to protect upwardly above the top member 22D when seated in the holder to leave a portion of the sample tube exposed above the holder by which the sample tube can be manually held for ease of handling.

The recording strip 21 in this embodiment is in the form of an elongated flat strip of recording material which is not responsive to normal light and heat intensities present in the laboratory, but which is responsive to the radiation from the flashlamp 19 to record an image therein. While the physical construction of the recording strip may take many forms, one satisfactory arrangement is that illustrated in FIGS. 8-10, wherein the strip 21 is a strip of plastic material, as later described suitably supported, for example, by cementing, adhering, or fastening the strip at least adjacent its opposite ends, and if desired, along its whole length, to an elongated rigid backing 21A having outwardly projecting ribs or tongue formations 21B at the lateral edges thereof slidably received in grooves in the sidewall members 22C, 22C', to support the strip of recording medium 21 adjacent the container tube 20 on the side thereof opposite the flash tube 19. Also, in the preferred embodiment, the indicia means forming the scale, the image of which is to be recorded in the portions of the recording strip lying above the sedimentary boundary layer in the fluid sample is in the form of a scale bearing plate or slide member 23 which is removably supported in suitable confronting grooves or channels in the members 22c, 22c' of the supporting assembly 22.

The scale member 23, in the preferred embodiment, is a relatively opaque sheet having a narrow vertically aligned row of horizontal transparent scale markings, and transparent numbers laterally spaced from the markings. The row of markings is aligned with and sufficiently close to the bore of the sample tube 20 so that radiation from the flashlamp is blocked off by the sediment from the scale markings falling below the sedimentary boundary layer, and thus radiation from the flashlamp is allowed to pass through only the scale markings above the level of the boundary layer and through the numbers which are spaced laterally from the scale markings and thus are not blocked off from flashlamp radiation by the sediment.

Preferably, the recording material is in the form of a strip of transparent plastic backing material, such as celluloid or the like, coated with a recording layer of material which is water permeable and is formed by a dispersion of particles composed wholly or mainly of hydrophobic thermoplastic polymeric, which are solid at room temperature and are capable of being rendered water impermeable or less water permeable in any given area, of the layer by the action of heat and/or pressure at that area, such as those recording layers described in British Pat. Nos. 1,139,891, 1,139,894, 1,139,895 and 1,138,896, granted to Gevaert Photo-Producten N.V., a Belgian company. The recording material preferably incorporate particles, such as carbon black, which responds to the flash to sufficiently heat the recording layer particles to render the recording material particles forming the image of the scale markings above the sediment boundary layer water impermeable. Preferably, the numbers on the scale member 23 also cast images in the recording strip as previously explained, and are appropriately positioned to directly indicate sedimentation rate in percentages on the record strip. After exposure, the recording strip can be simply washed with water, to remove the unheated areas and leave black image marks and numbers corresponding to the scale member markings above the boundary layer and the scale member numbers.

To facilitate adjustment of the scale member 23 in proper registry with the sample tube 20, a setscrew mechanism 23A is provided in the lower block member 22A', manipulatable from the bottom of the holder assembly, for vertical adjustment of the scale member 23 to register the zero mark thereon precisely with the fill index mark 20A on the sample tube 20.

The backing member 21A may be made of breakable plastic and be provided with a transverse V-cut 21B', as shown, to facilitate breaking off of the lower portion and removal from the recording strip 21, thus freeing the lower part of the latter to be grasped and stripped from the remainder of the backing 21A.

In another satisfactory form of the strip 21, a recording layer of material of the kind previously described is directly deposited, or coated, on one side of a clear, plastic strip, such as acetate, of sufficient thickness to resist bunching and of sufficient length and width to equal or exceed the lengths and width of the sample tube 20. The plastic strip should also have sufficient additional lengths, which is uncoated, to facilitate handling of the slide strip during insertion and removal from the grooves in the sidewall members 22C, 22C', in which the tongue formation 21B of the earlier described backing 21A is fitted.

Referring more particularly to the electronic circuitry, and specifically to the Power Supply 12 shown schematically in FIG. 2, composed of high-voltage power supply section 12H and low-voltage power supply section 12L, the high-voltage power supply section 12H comprises the secondary winding W1 of transformer 12-T1 designed to step up the voltage applied to the primary winding to about 660 volts at about 50 milliamps. This voltage charges the two capacitors 12-C3 and 12-C4 to approximately 880 volts DC, the charging current being limited by resistor 12-R1 and rectified by diode 12-CR1. This voltage is impressed across the flash tube 19 by applying the same to the opposite electrodes 19A and 19B, so that the flash tube 19 is ready for immediate discharge when triggered by the Flash Tube Trigger Circuit 18. The high-voltage power supply across capacitors 12-C3 and 12-C4 is also applied through a voltage divider network formed of resistors 18-R7 and 18-R8, charging the 0.22 mf. capacitor 18-C5 to approximately 160 volts DC, which voltage is impressed across the trigger transformer 18-T2. The transformer 18-T2 is connected with a silicon controlled rectifier (SCR) in the Trigger Circuit 17 as later described, through the lead to terminal H shown in FIGS. 2 and 7, and a pushbutton switch 12-S2 is connected between this lead and ground for testing the flash.

The voltage across the capacitors 12-C3 and 12-C4 is also applied across voltage divider 12-R2 and 12-R3 and through limiting resistors 12-R4, 12-R5 and 12-R6 to neon indicator lamps 12-NE3 (amber), 12-NE2 (white), and 12-NE1 (red), respectively, connected to terminals G, B and A, shown in FIGS. 2 and 7 to be energized as later described. The switch 12-S1 in the input leads to the primary of transformer 12-T1 in the main power switch, and the capacitors 12-C1 and 12-C2 are provided to suppress all transients coming from the AC line.

In the low voltage section 12L of the power supply, another secondary winding W2 of the transformer 12-T1 provides a stepped down voltage supply of about 8 volts at about 3.5 amperes which is applied to a bridge rectifier made up of diodes 12-CR2 to 12-CR5, producing a pulsating DC which is applied across a large capacitor 12-C6 to filter the same. The DC voltage is regulated by means of a power transistor 12-Q1, the reference to hold this transistor being fed by a Zenner diode 12-CR6 connected to the base of the transistor 12-Q1 to hold the emitter at a constant voltage. This Zener diode 12-CR6 is back-biased by the resistor 12-R10 and a capacitor 12-C7 is used across the Zener diode to lower the ripple output.

Figure 5:
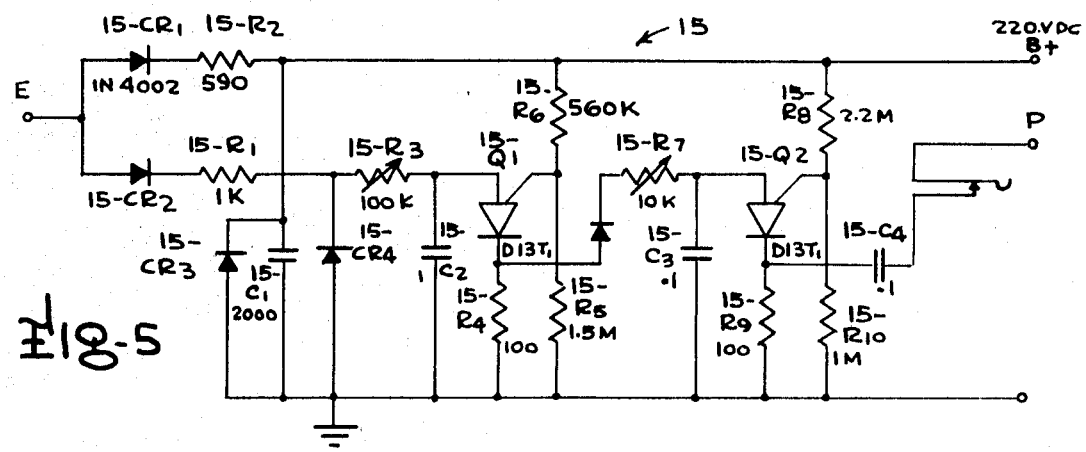
FIG. 5 is a schematic diagram of the One Second Pulse Generator employed in the apparatus of the present invention.

As will be apparent form FIG. 2, a third secondary winding W3 designed to step down the voltage to about 40 volts AC at about 20 milliamps is connected to terminal E shown in FIGS. 2 and 5.

A reed switch 12-RE1 has its contacts connected in series with resistor $12\text{-}R_{12}$ across the capacitors $12\text{-}C_3$ and $12\text{-}C_4$ to ground and its coil is connected between the output of the rectifier bridge 12-CR2 to 12-CR5 and ground to discharge the high-voltage charge on these capacitors when power is removed from the unit by turning switch $12\text{-}S_1$ to the "off" position.

Representative values for the circuit elements shown in FIG. 2 are set out in the following table:

PARTS LIST FOR FIG. 2

| | | |
|---|---|---|
| 12-R1 | 2.5 K | 10 W. |
| 12-R2 | 300 K | 1 W. |
| 12-R3 | 130 K | 1 W. |
| 12-R4 | 100 K | ½ W. |
| 12-R5 | 100 K | ½ W. |
| 12-R6 | 100 K | ½ W. |
| 12-R7 | 3.3 Meg | ½ W. |
| 18-R8 | 1 Meg | ½ W. |
| 18-R9 | Pholoresistor | |
| 12-R10 | 100 Ohms | ½ W. |
| 12-R11 | 100 K | ½ W. |
| 12-R12 | 5000 Ohms above 10 W. | |
| 12-C1 | 0.002 mfd. at 600 V. | |
| 12-C2 | 0.002 mfd. at 600 V. | |
| 12-C3 | 500 mfd. at 450 WVDC | |
| 12-C4 | 500 mfd. at 450 WVDC | |
| 18-C5 | 0.22 mfd. at 200 v. | |
| 12-C6 | 8000 mfd. at 15 v. | |
| 12-C7 | 2000 mfd. at 10 v. | |
| 12-S1 | DPDT Switch | |
| 12-NE 1 | Neon lamp with resistor | (Red) |
| 12-NE 2 | Neon lamp with resistor | (White) |
| 12-NE 3 | Neon lamp with resistor | (Amber) |
| 12-NE 4 | Neon lamp with resistor | (Red) |
| 12-Q1 | MJ 480 Motorola | |
| 12-CR 1 | 2400 V PIV Diode | |
| 12-CR 2-5 | MDA 1591-1 | |
| $F_1$ | ½ Amp. SB-3AG Fuse and Fuse Holder | |
| $12\text{-}CR_6$ | Zener Diode: 1N4733 1 Watt | |
| $12\text{-}T_1$ | Primary: 117 or 230 VAC, 50 or 60 cps; Sec.: 660 VAC at 50 mA; 40 VAC at 20 mA; 8 VAC at 3.5 Amp. | |
| $12\text{-}T_2$ | Trigger Transformer for Flash Tube | |
| 12-RE1 | Reed switch having 900 ohm, 1000 volt coil. | |

Figure 3:
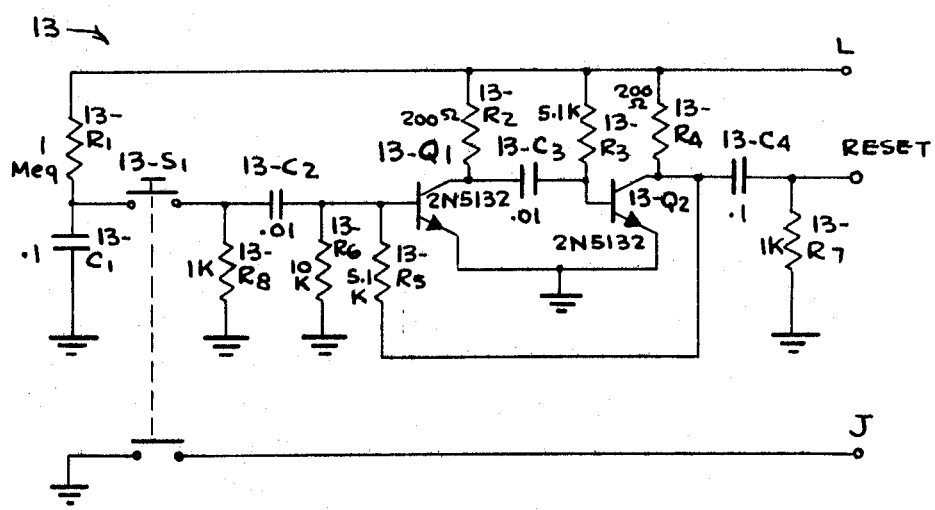
FIG. 3 is a schematic diagram of the Reset Circuit.

The Reset Circuit 13, shown in Fig. 3, to which the emitter of the power transistor 12-Q1 is connected through the terminal L, comprises essentially an RC circuit, charged from the low-voltage power supply 12L, a double pole, double throw, pushbutton switch 13-S1, forming the RESET switch for the system, A Schmitt trigger circuit, and a trigger circuit reset. Following closure of the main power switch 12-S1, the capacitor 13-RC1 of the Reset Circuit 13 is charged through resistor 13-R1. When the RESET pushbutton 13-S1 is pressed, the charge on 13-C1 is discharged through the resistor 13-R8, causing a pulse to be generated at the base of the transistor 13-Q1 applied through the capacitor 13-C2. The transistors 13-Q1 and 13-Q2 form a Schmitt trigger. Assuming that transistor 13-Q1 is not conducting, the base of transistor 13-Q2 is biased to the power supply voltage through resistor 13-R3. When the input approaches a critical voltage, transistor 13-Q1 begins to conduct and regeneratively turns off transistor 13-Q2. If the input pulse is removed, capacitor 13-C3 holds transistor 13-Q2 off for a small time, and then it returns to a conducting state. Resistor 13-R2 is the load resistor for transistor 13-Q1, and resistor 13-R4 is the load resistor for transistor 13-Q2. Resistor 13-R6 holds the base of 13-Q1 at ground and resistor 13-R5 is used for regenerative action.

The pulse from the collector of transistor 13-Q2 is coupled to the 3600 Counter Circuit 14 through capacitor 13-C4 and the terminal mark "RESET," loaded by the resistor 13-R7. The Schmitt trigger pulse through capacitor C4 resets the 3600 Counter Circuit to a zero state, to start a new timing cycle.

Also, upon pressing of the RESET pushbutton 13-S1, the lower pole thereof grounds the terminal J as shown in FIG. 3, resetting the Silicon-Controlled Rectifiers in the Trigger Circuit 17 of the FIG. 7 as later described.

The 40-volt output from the winding W3 of the power supply transformer T1 to the terminal E is rectified in the lower branch from the terminal E by the diode 15-CR2, producing pulsating DC which is fed through the limiting resistor 15-R1 and a clipping diode 15-CR4. The clipped pulses are fed through a potentiometer 15-R3 to a capacitor 15-C2, which charges over a 10-cycle rate and then is discharged by a "programmable unijunction transistor" or PUT 15-Q1, such as a General Electric D13T1, coupled to provide a count-to-10 (staircase generator-counter) circuit. This count-to-10 circuit formed by PUT 15-Q1 feeds a count-to-six or count-to-five circuit, depending on whether a 60-cycle or 50-cycle supply is connected to the power supply transformer, the cathode of the PUT 15-Q1 being connected through a coupling diode 15-CR5 and potentiometer 15-R7 to charge capacitor 15-C3 over a six- or five-cycle rate after which the capacitor 15-C3 is discharged by the programmable unijunction transistor 15-Q1. Resistors 15-R6 and 15-R5 set the bias point on transistor 15-Q1, and resistors 15-R8 and 15-R10 set the bias point for transistor 15-Q2. Resistors 15-R4 and 15-R9 are cathode resistors for these two transistors. Assuming a 60-cycle per second AC voltage is applied to the input to Power Supply 12, the count-to-10 stage followed by the count-to-six stage of the One Second Pulse Generator 15 therefore produces out output pulse per second applied through the coupling capacitor 15-C4 and terminal P to the input to the 3600 Counter Circuit 14 of FIG. 4.

Alternatively, a circuit such as shown schematically in FIG. 5A may be used. In this circuit, five sections are provided, an input filter, a shaper, a count-to-12 circuit, a count-to-five circuit, and a driver circuit. The first count-to-12 circuit is formed of an integrated circuit, such as the Texas Instrument Integrated Circuit designated SN7,492, which is wired as indicated (the numbers indicating the pin numbers for the integrated circuit) to provide a count-to-12 stage for a 60-cycle AC input, or in the case a 50-cycle-per-second AC input is provided, to count to 10.

The 6.3-volt AC 60-cycle-per-second voltage from the power supply transformer 12-T1 or 12'-T1 is fed through the filter section of the pulse generator 15' of FIG. 5A, where all noise and transients are filtered out. The sine wave signal is fed to the shaper transistor, which is biased off, until a positive signal turns the circuit on. Due to the gain of the circuit, the transistor is turned on "hard," forming a square wave output. The capacitor across the 10K resistor is used for speedup of the trailing edge of the output and insures better triggering for the integrated circuits. The two integrated circuits can be of any type flip-flop wired for this type of counting circuit, rather than the integrated circuits illustrated. The driver circuit formed by the transistor 15'-Q2 is used to drive the plurality of counters of the 3600 Counter Circuit 14.

Instead of using these circuits for generating one pulse per minute by counting of the cycles of the 60-cycle or 50-cycle AC input, any of many known types of oscillators or timing circuits operating off a DC supply may be used to generate pulses of the desired frequency. For example, tuning form controlled oscillators, crystal controlled oscillators, reed relay oscillators, and known types of controlled or variable frequency oscillators may be used to supply the one pulse per second input to the 3600 Counter Circuit, either directly or through a Schmitt trigger or other timing circuit synchronized by the oscillator and producing a proper pulse output for application to the Counter Circuit 14.

Figure 4:
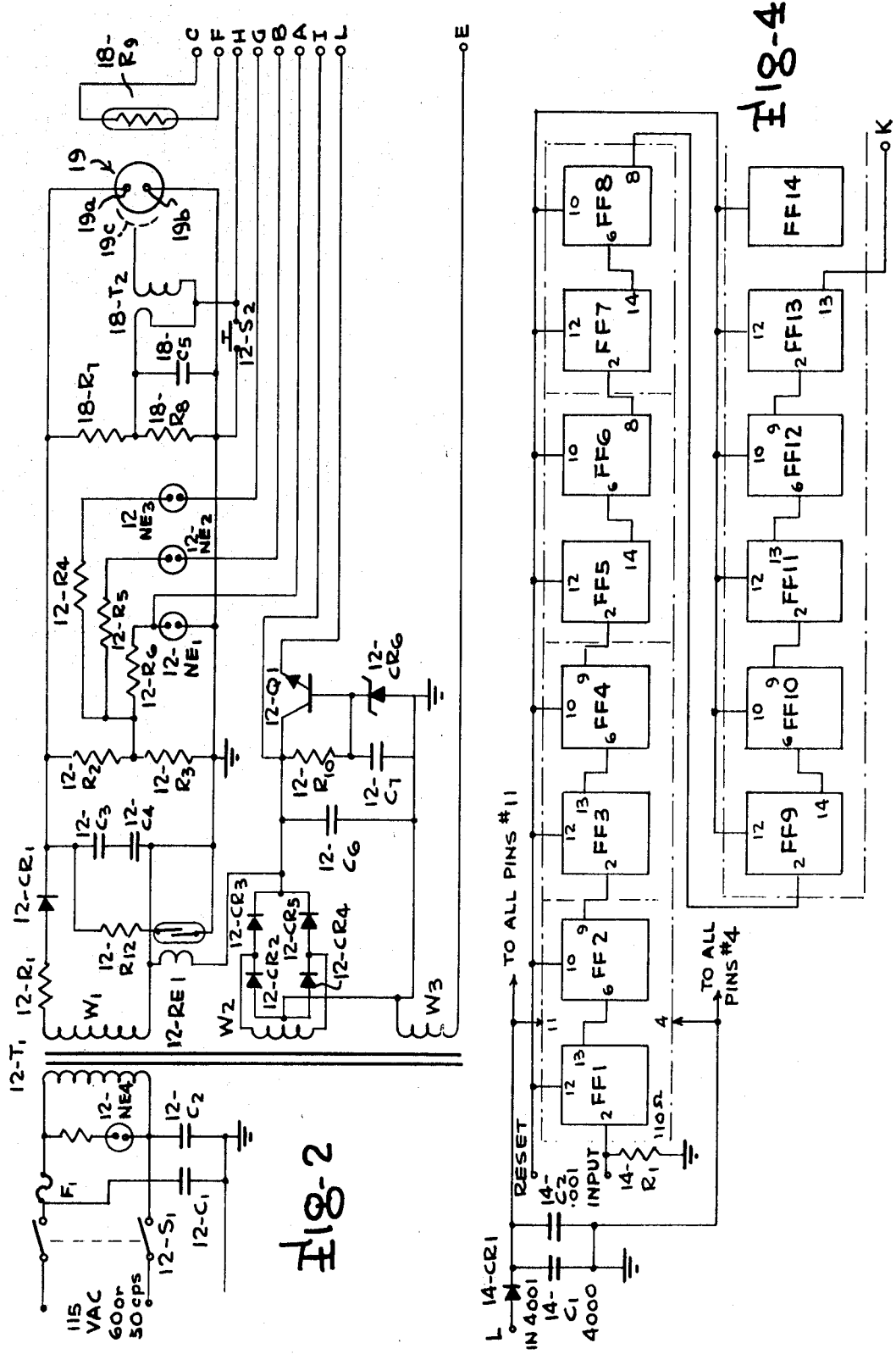
FIG. 4 is a detailed block diagram of the 3600 Counter Circuit employed in the apparatus of the present invention.

The 3600 Counter Circuit uses conventional digital circuitry in the form of 13 flip-flops, which in the illustrated embodiment in FIG. 4 are formed from seven dual flip-flop integrated circuit units, such as the MC 790-P "Dual J-K Flip-Flop" units produced by Motorola, Inc., the pins for the successive flip-flop stages being interconnected with each other and with the RESET terminal R and the input terminal P as shown in FIG. 4. It will be observed that while a total count of 4,096 would be obtained from 13 flip-flops, this is reduced to a total count of 3,600 by subtracting a count of 496 from the 4,096 by the connections from the zero state (the pins 14 and 8) of flip-flops FF5, FF6, FF7, FF8, and FF9, while all of the other flip-flops are fed from the "one" state). It should be apparent that following pressing of the RESET pushbutton 13-S1, which resets the flip-flops of the 3600 Counter Circuit, the one per second pulses produced by the One Second Pulse Generator 15 will be counted by the 3600 Counter Circuit 14 until the full count of 3,600 is reached, thereby producing an output pulse applied to the terminal K exactly 1 hour following pressing of the pushbutton RESET switch 13-S1. The Vcc supply for these flip-flop units is preferably supplied from terminal L of the Power Supply through coupling diode 14-CR1 and across capacitors 14-C1 and 14-C2 to decouple this counter circuit from the other circuits.

Figure 6:
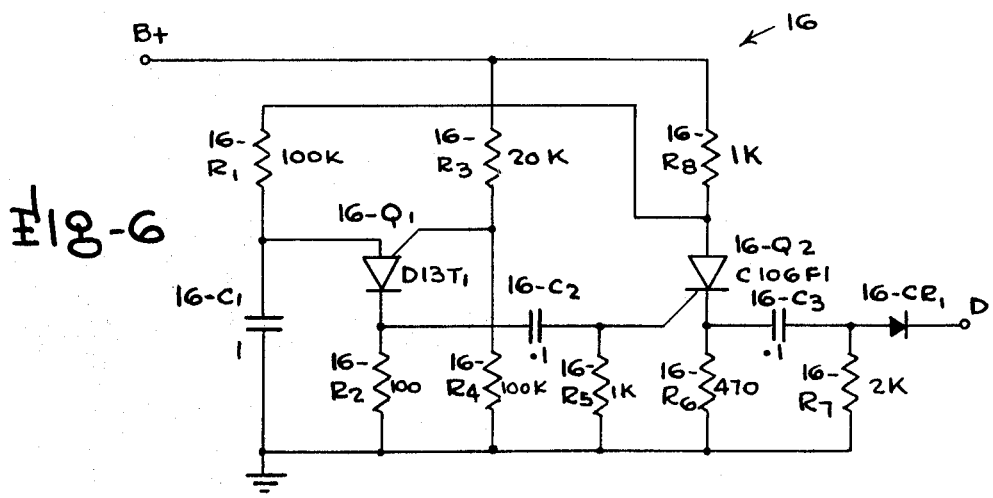
FIG. 6 is a schematic diagram of the Automatic Set Circuit employed in the apparatus.

It will also be noted that in the embodiment shown in FIG. 5, the 40-volt output from the low-voltage section of the Power Supply 12 applied through the terminal E is also fed from a rectifier circuit formed of diode 15-CR1, resistor 15-R2, Zener diode 15-CR3 and filtering capacitor 15-C1, providing B+ voltage for the count-to-10 and count-to-six stages of the pulse generator 15 and also providing B+ voltage to the Auto Set Circuit 16 of FIG. 6. This Auto Set Circuit comprises a programmable unijunction transistor used as a relaxation oscillator and a silicon-controlled rectifier. When power is applied to the circuit, the anode is reverse biased and hence nonconducting. As the capacitor 16-C1 is charged through the resistors 16-R1 and 16-R8, the anode rises exponentially toward the supply voltage of 22 volts. When this anode voltage reaches the peak point voltage $V_p$, the anode becomes forward biased and the internal resistance becomes very low, discharging the capacitor through resistor 16-R2. The resistors 16-R3 and 16-R4 set the peak point voltage $V_p$. The voltage drop across resistor 16-R2 is coupled through the capacitor 16-C2 to the gate of the SCR 16-Q2, turning on the SCR and generating a pulse which is coupled through the capacitor 16-C3 and blocking diode 16-CR1 to terminal D for application to the Trigger Circuit 17. Also, the voltage at 16-R1 drops due to the firing of the SCR 16-Q2, causing this voltage to drop below the peak point voltage $V_p$ of the programmable unijunction transistor 16-Q1, so that the capacitor 16-C1 cannot charge to this point and the unijunction is held off. The circuit therefore acts as a one-shot circuit. Once the SCR 16-Q2 has been turned on, it stays on until the power has been turned off.

Figure 7:
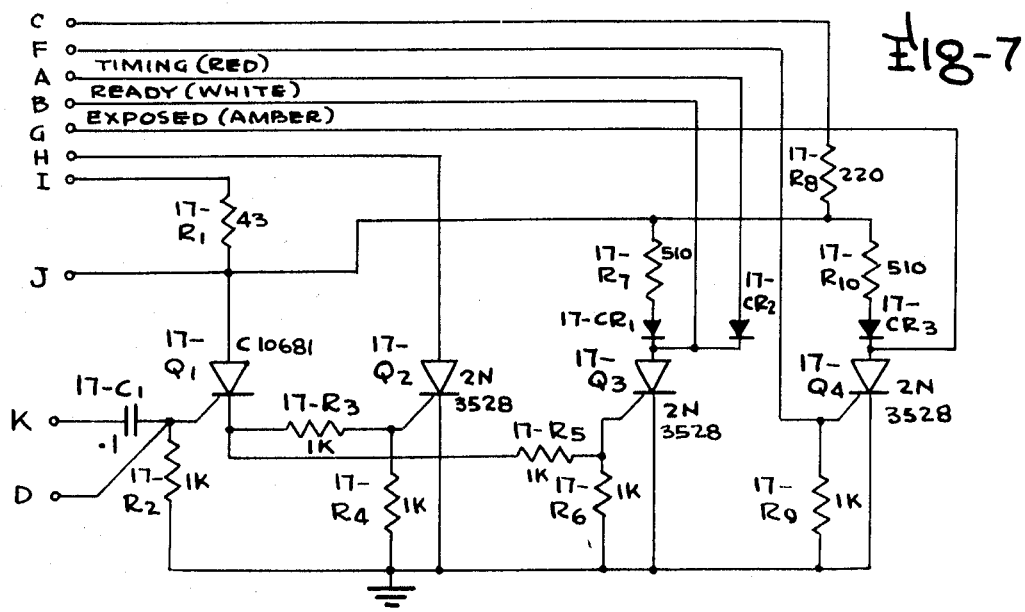
FIG. 7 is a schematic diagram of the Trigger Circuit employed in the apparatus of the present invention.

Referring to FIG. 7, it will be seen that the set pulse produced when the SCR 16-Q2 is turned on is applied through the terminal D to the gate of the SCR 17-Q1 in the Trigger Circuit 17. The Trigger Circuit 17 is designed to fire at the end of the 1-hour timing cycle determined by the count of 3,600 one-per-second pulses by the counter 14 to cause activation of the flash tube 19 to produce the exposure record. The set pulse applied to the gate of the SCR 17-Q1 sets this SCR, and the SCR 17-Q2, 17-Q3 and 17-Q4 to enable them to be turned on at the appropriate times. This occurs a few seconds after momentary closure of the RESET switch 13-S1 due to the delay provided in the Auto Set Circuit 16. The closure of the lower pole of the switch 13-S1 to ground the terminal J (see FIG. 3) resets each of the SCR 17-Q1, 17-Q3 and 17-Q4, (and SCR 17-Q2) upon closure of the switch 13-S1. The application of the set pulse from the Set Circuit 16 to the SCR 17-Q3 conditions this SCR in a state causing the "timing" lamp 12-Ne1 to turn on, indicating that the system is timing out a 1-hour cycle. At the completion of the 1-hour cycle, the 1-hour pulse produced by the Counter Circuit 14 applied through terminal K and capacitor 17-C1 to the gate of the SCR 17-Q1 causes the latter to turn on. Current is fed by the SCR 17-Q1 through resistors 17-R3 and 17-R5 to the gate circuits of SCR 17-Q2 and 17-Q3, turning these SCR's on. Turning on of SCR 17-Q2 discharges the 0.22 mf. capacitor 18-C5 in the Flash Tube Trigger Circuit 18, through the pulse transformer 18-T2, thereby impressing a high-potential voltage across the flash tube trigger strip 19C, ionizing the flash tube into conduction to produce the very high intensity flash. The radiant energy from this flash passing through the sample containing tube 20 and the scale markings of the scale means 23 lying above the sedimentary bounding layer (and through the laterally spaced numbers on the scale means) activates the recording material (for example, by localized heating in the areas of the recording material corresponding to the scale markings above the boundary layer) to produce a record image in terms of difference in the water permeabilities of the different image areas of the recording layer. It will be noted that the voltage from the SCR 17-Q1 which turns on SCR 17-Q3 switches the state of the latter and changes the indicator lamps, causing the "ready" or white lamp 12-Ne2 to be energized to indicate the timing cycle has been completed.

It will be observed that the SCR 17-Q4 gate is controlled by the photoresistor 18-R9 exposed to the flash tube 19, causing the SCR 17-Q4 to turn on and energize the amber indicator lamp 12-Ne3 to show that a flash has taken place.

The resistors 17-R2, 17-R4, 17-B6 and 17-R9 are provided to hold the gate voltages close to the cathode resistors 17-R7 and 17-R10 are used for current limiting in the SCR 17-Q3 and 17-Q4, and the diodes 17-CR1, 17-CR2 and 17-CR3 are used for blocking high voltages from the low-voltage power supply.

It will therefore be apparent that the solid-state circuitry hereinabove described provides an efficient and reliable means for automatically timing out the necessary 1-hour cycle for the proper standing time for the fluid sample to be subjected to sedimentation tests. The technician simply places the fluid sample which has been properly prepared and placed in the sample containing tube 20 in the holder with an unexposed strip of recording medium, and presses the RESET button 13-S1 after the unit has been turned on by closure of the main power switch 12-S1. The closure of the RESET button 13-S1 completely resets the SCR's in the trigger circuit 17, and resets the 3600 Counter Circuit 14 so as to immediately start counting from a zero count condition the one per second pulses produced by the Pulse Generator 15, until 3,600 of such pulses have been counted. Upon completion of that count, the output pulse through the terminal K from the Counter Circuit 14 activates the SCR's 17-Q1 to 17-Q4 in the manner previously described to trigger the flash tube 19 for providing the necessary exposure to record the proper image in the recording medium strip.

It will be appreciated that many other types of timing mechanisms can be used to time out the 1-hour cycle, such as timing discs driven by synchronous motors, spring motors and the like, which either have contacts and commutator strips, or holes and photocells, or magnetic material and proximate reed switches, to produce an appropriate signal at the end of 1 hour's standing time for cycling the apparatus through the events or functions necessary to effect exposure of the recording medium. However, by use of the solid-state circuitry hereinabove described, many problems attendant to such other timing mechanisms are eliminated, particularly problems arising from difficulties in effecting precision timing of the end of 1 hour by a discontinuity, such as a hole, commutator or magnet on a rotating disc, as compared with the precision which can be achieved by the pulse counting circuitry hereinabove described.

Other types of Power Supply circuits may be used, such for example, as that shown schematically in FIG. 2A, wherein a transformer 12A-T1 having only a 650-volt secondary winding and a 6.3-volt center tap secondary winding, may be used, permitting use of a less expensive transformer. For example, in the low-voltage power supply portion of the alternate circuit shown in FIG. 2A, the AC input to the circuit is impressed on the primary of the transformer 12'-T1, which provides isolation between the input and the output. The secondary windings 12'-W2 of the transformer 12-T1 of FIG. 2A step down the voltage to a desired value, for example, 6.3 volts AC, for application to the full-wave rectifier formed of the diodes 12'-CR3 and 12'-CR4. The rectifier voltage is filtered by a capacitor 12'-C6 and applied to a regulator circuit consisting of a feedback loop which includes a detector 12'-Q3 and a Darlington pair 12'-Q1 and 12'-Q2 forming a series regulator. The transistor 12'-Q2 is a driver used as a current amplifier for transistor 12'-Q1. The circuit will compensate for any changes in the output voltage due to line or load changes. The action of the regulator is continuous and instantaneous. The 5,000 mf. capacitor 12'-C9 is used to lower the loop gain at high frequencies, and the Zener diode 12'-CR2 as well as the resistors 12'-R14 and 12'-R15 provide a voltage divider to permit the output voltage to be compared to the reference Zener diode. Resistor 12'-R13 is used to back bias the Zener diode to its reverse breakdown region. Capacitor 12'-C7 is used to lower any ripple at the emitter of transistor 12'-Q3 and capacitor 12'-C8 is used to lower the loop gain. In the operation of this circuit, assuming the output voltage increased due to a load or line change, the increase of output voltage will decrease the base-to-emitter voltage of transistor 12'-Q3 which will decrease the collector current. This decrease of collector current will decrease the voltage drop across the collector resistor 12'-R10, which effectively reduces the emitter-to-base voltage of the series regulator transistors 12'-Q1 and 12'-Q2. This will increase the voltage drop across the emitter-to-collector of the series regulator formed by the transistors 12'-Q1 and 12-Q2, which tends to restore the output voltage back to its designed voltage.

Figure 13:
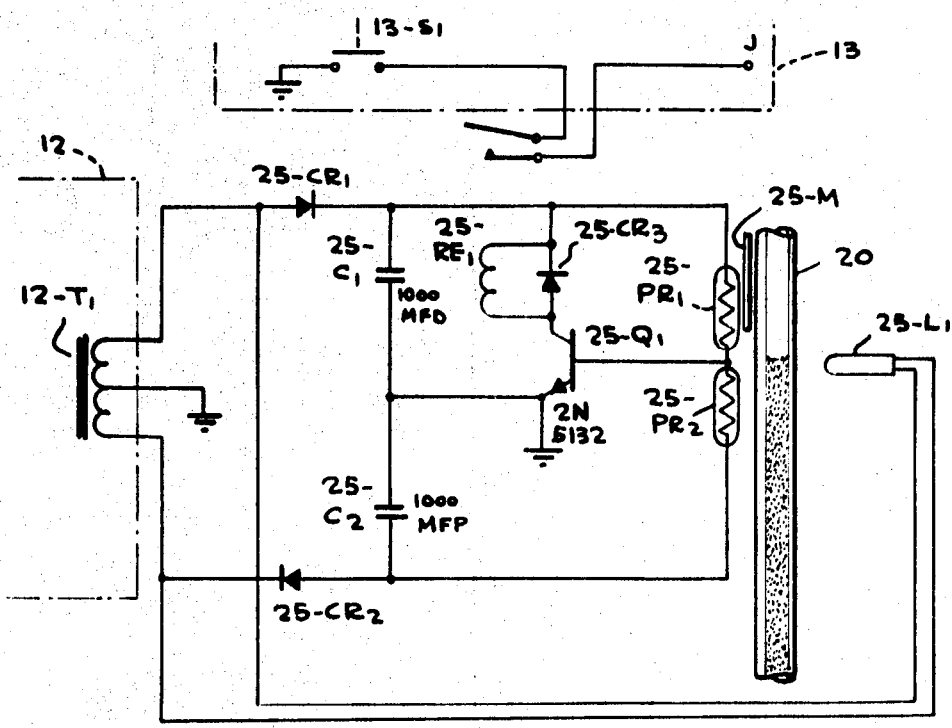
FIG. 13 is a schematic diagram of the circuitry for detecting when the sample tube has been filled to the proper level.

A safety circuit such as that shown in FIG. 13 may be provided to insure that the liquid level in the sample tube 20 is at the correct level, and prevent operation of the RESET circuit to terminal J unless the proper fill level is present. The circuit comprises a lamp 25-L1, which may either be a 6.3-volt lamp or a 115-volt lamp as desired, located in the holder sidewall 22C', and a pair of vertically spaced photoresistors 25-PR1, 25-PR2. These photoresistors are covered with a mask 25-M having a slot therein which corresponds to the bore of the sample tube 20 over a selected zone below the desired fill mark and for a slight distance, corresponding to a selected low percentage error, above the fill mark. These photoresistors are coupled with the power supply 12, for example, a 6.3-volt secondary of the transformer 12-T1, through a circuit as shown in FIG. 13, including a transistor 25-Q1 controlling a relay 25-RE1 whose contacts are interposed in the conductor between RESET switch 13-S1 and terminal J. If the liquid level in the sample tube is correct, the liquid blocks off light from photoresistor 25-PR2, and the light on 25-PR1 applies a bias voltage to transistor 25-Q1, for example, of about +4.6 volts, causing it to conduct and energize the relay 25-RE1 to close its contacts and permit closure of RESET switch 13-S1 to start the timing of a new cycle. If light is admitted through the slot in mask 25-M to both photoresistors 25-PR1 and 25-PR2, or to neither, indicating an incorrect liquid level, the bias voltage is such that transistor 25-Q1 will not conduct, the relay 25-RE1 will not close, and the RESET switch cannot start a new timing cycle.

It has been observed that the speed of the sedimentation rate is by no means uniform for every liquid. For instance, in the case of blood, the time-sedimentation diagram of the same blood with ordinants taken at intervals of, for instance, 3 or 5-minute intervals, is very different from one donor to the other. In the case of human blood, taken from diseased patients, it appears that the sedimentation rate pattern taken at short intervals, for example, 3 or 5-minute intervals, produces a diagram or curve which seems to be indicative of the type of disease involved. By measuring the sedimentation with great accuracy, as can be achieved with the sedimentation rate recording apparatus of the present invention, so as to obtain a measure of the sedimentation rate at a plurality of preselected time intervals by timing plural samples of the same blood, a sequence-time sedimentation rate curve can be obtained from which the relationship between the shape of the curve and type of disease can be ascertained.

To facilitate making sedimentation rate tests of plural samples of the same liquid, such as plural samples of the same blood taken from one donor to obtain such a sequence-timed sedimentation rate curve, at intervals of, for example, 5 minutes, a plurality of sedimentation rate recording devices as hereinabove described, hereinafter referred to as a plurality of channels of sedimentation rate recorders, are installed in one cabinet and are intercoupled with an automatic sequence trigger circuit as indicated schematically in FIG. 14 in the manner illustrated. Assuming, for simplicity of explanation, that the automatic sequence trigger circuit, indicated generally by the reference character 30, is incorporated in a five channel blood test machine having five identical channels each constituting an automatic blood sedimentation rate recorder as illustrated in block diagram in FIG. 1 and as described more fully hereinabove, the automatic sequence trigger circuit 30 is provided to step the second, third, fourth, and fifth channels of the machine through a timed sequence after the first channel has been reset. As illustrated in FIG. 14, the automatic sequence trigger circuit 30-A associated with the first channel, shown schematically in FIG. 14, basically comprises a pair of transistors 30-Q1 and 30-Q2 making up a Schmitt Trigger Circuit, and a switching transistor 30-Q3. The pulse from the output terminal K of the 3,600 Counter Circuit 14 of the first channel, which pulse is generated after a complete cycle has taken place, is applied through switch 30-S1, when in the automatic sequence position shown, through a 0.01 mf. capacitor to the base of 30-Q1. The Schmitt Trigger Circuit formed by the transistors 30-Q1 and 30-Q2 operate similar to the Schmitt trigger of the reset circuit 13 previously described, generating a new pulse which is fed through terminal 30-A1 to the input to the base of transistor 13-Q1 of the reset circuit 13 for channel number 2, to activate the reset circuit for channel number 2 and cause it to set its 3,600 divider circuit 14 to zero. Also, the switching transistor 30-Q3 is caused to conduct and resets the silicon controlled rectifier 17-Q1, 17-Q2, 17-Q3 and 17-Q4 of the Trigger Circuit of channel number 2 back to their off state and thus cause a timing cycle to begin in channel number 2.

When channel number 2 has completed timing out its preselected interval, the automatic sequence trigger circuit 30-B operates in the same manner as previously described, for the first channel, responsive to the pulse from the terminal K of the 3,600 counter circuit 14 of channel number 2 through switch 30-S2 in the automatic position, in the same manner as the automatic sequence trigger circuit 30-A previously operated. When channel 3 completes its cycle, channel 4 is then initiated by the associated automatic sequence trigger circuit 30-C and so on, until all five channels have been sequenced through their cycle. At the completion of the cycle for each channel, its respective flash tube is energized to cause the sedimentation condition of the liquid sample in the sample container tube 20 associated with the respective channel to be recorded in the manner previously described for the embodiment shown in FIGS. 1–13.

It will be appreciated that any interval may be selected as the interval through which each channel is to be timed, by connecting the optional external time input jack shown in FIGS. 1, 5 and 5A to a stable square wave generator producing pulses at whatever frequency is desired to cause production of pulses at the output K of the 3600 counter circuit at the desired interval. For example, if it is desired to sequence the channels at 5-minute intervals, the square wave generators should be set to produce 12 pulses per second. By inserting the stable square wave generator in the input provided to the optional external time input jack at the output of the 1 second pulse generator, the 1 second pulse generator is disconnected and the timing of each channel is regulated by the external square wave generator at the selected speed.

What is claimed is:

1. Apparatus for automatically timing and recording sedimentation rate and similar tests of fluid samples for a selected test period, comprising an axially elongated, vertically disposed exposure source for emitting selected radiant energy, an axially elongated light-transmissive sample container tube for holding a quantity of a fluid sample in a test zone thereof, an elongated recording strip of material responsive to said radiant energy for recording an image indicative of the location of the boundary layer, said exposure source and recording strip having a height to span said test zone, holder means for removably supporting said container tube and recording strip in a fixed vertical position with the tube between said source and strip and the axes of said tube and source in parallelism in a vertical plane intercepting said strip to record an image in said strip indicating the location of said boundary layer upon activation of said source, and control circuit means including electrical timing circuitry operable substantially concurrently with insertion of the container tube in said holder means for timing said test period including means for producing pulses and counter means for counting said pulses and producing an exposure signal upon attainment of a selected pulse count corresponding to said selected period, and exposure circuit means responsive to said exposure signal to energize said exposure source to emit said radiant energy for recording said image.

2. Apparatus as defined in claim 1, wherein said exposure source is a high-intensity flashlamp, and said recording strip is responsive to momentary energization of said flash lamp to record said image.

3. Apparatus as defined in claim 2, wherein said flashlamp includes a first pair of electrodes for arming the same and a third trigger electrode to fire the flashlamp, and said exposure circuit means includes means for developing a high voltage charge in excess of several hundred volts to be applied across said first pair of electrodes of said flashlamp and includes a trigger circuit activated responsive to said exposure signal to apply a trigger voltage to said third electrode to fire the flashlamp.

4. Apparatus as defined in claim 1, wherein said means for producing pulses is an electronic pulse generator circuit for producing clock pulses at a selected uniform pulse repetition rate and said counter means comprises a series of counter circuits responsive to said clock pulses to produce said exposure signal upon counting a number of said clock pulses corresponding to the duration of an appropriate standing period for said sample to enable a boundary layer of opaque matter to form therein appropriate for determination of the proportion of said opaque matter in said sample.

5. Apparatus as defined in claim 1 wherein said means for producing pulses is an electronic pulse generator circuit for producing clock pulses at a rate of one pulse per second responsive to a pulsating voltage derived from an alternating current supply voltage by counting the pulsations of said pulsating voltage in preselected relation to the number of cycles per second of said supply voltage and producing a clock pulse at the conclusion of each of said number of cycles, and said counter means comprises a series of counter circuits responsive to said clock pulses to produce said exposure signal upon counting a number of said clock pulses corresponding to the time duration of the selected test period following insertion of said container tube.

6. Apparatus as defined in claim 3, wherein said means for producing pulses is an electronic pulse generator circuit for producing clock pulses at a selected uniform pulse repetition rate and said counter means comprises a series of counter circuits responsive to said clock pulses to produce said exposure signal upon counting a number of said clock pulses corresponding to the time duration of the selected test period following insertion of said container tube.

7. Apparatus as defined in claim 3, wherein said means for producing pulses is an electronic pulse generator circuit for producing clock pulses at a rate of one pulse per second responsive to a pulsating voltage derived from an alternating current supply voltage by counting the pulsations of said pulsating voltage in preselected relation to the number of cycles per second of said voltage and producing a clock pulse at the conclusion of each of said number cycles and said counter means comprises a series of counter circuits responsive to said clock pulses to produce said exposure signal upon counting a number of said clock pulses corresponding to 1 hour following insertion of said container tube.

8. Apparatus as defined in claim 1, wherein said holder means includes scale means disposed between said strip and exposure source in alignment with radiant energy paths through said tube for casting image patterns on said strip in horizontal alignment with the portions of said test zone not occluded by sedimentation to thereby indicate the location of said boundary layer.

9. Apparatus as defined in claim 3, wherein said holder means includes scale means disposed between said strip and exposure source in alignment with radiant energy paths through said tube for casting image patterns on said strip in horizontal alignment with the portions of said test zone not occluded by sedimentation to thereby indicate the location of said boundary layer.

10. Apparatus as defined in claim 5, wherein said holder means includes scale means disposed between said strip and exposure source in alignment with radiant energy paths through said tube for casting image patterns on said strip in horizontal alignment with the portions of said test zone not occluded by sedimentation to thereby indicate the location of said boundary layer.

11. Apparatus as defined in claim 8 wherein a slide member supported for vertical movement in said holder means includes said scale means, and said holder means includes an adjustment member bearing on said slide member for positioning said scale means in proper horizontal alignment with said tube.

12. Apparatus as defined in claim 10 wherein a slide member supported for vertical movement in said holder means includes said scale means, and said holder means includes an adjustment member bearing on said slide member for positioning said scale means in proper horizontal alignment with said tube.

13. Apparatus as defined in claim 1, wherein said control circuit means includes plural indicator lamps and control means therefor for activating said indicator lamps to distinctively signal when a test period is in the course of being timed, when said exposure source has been energized, and when said apparatus is conditioned to commence a test period.

14. Apparatus as defined in claim 3, wherein said control circuit means includes plural indicator lamps and control means therefor for activating said indicator lamps to distinctively signal when a test period is in the course of being timed, when said exposure source has been energized, and when said apparatus is conditioned to commence a test period.

15. Apparatus for automatically timing and recording sedimentation rate and similar tests of fluid samples for a selected test period, comprising an axially elongated, vertically disposed flashlamp for emitting momentary high-intensity radiant energy, an axially elongated light-transmissive sample container tube for holding a quantity of a fluid sample in a test zone thereof, an elongated recording strip of material which is normally nonresponsive to ordinary ambient light and heat intensities but which is responsive to said radiant energy emitted by said flashlamp for recording an image indicative of the location of the sedimentary boundary layer at the end of the selected test period, said flashlamp and recording strip having a height to span said test zone, holder means for removably supporting said container tube and recording strip in a fixed vertical position with the tube between said lamp and strip and the axes of said tube and lamp in parallelism in a vertical plane intercepting said strip to record an image in said strip indicating the location of said boundary layer upon activation of said flashlamp, and control means including electrical timing means operable substantially concurrently with insertion of the container tube in said holder means for automatically timing said test period and producing an exposure signal at the conclusion thereof and exposure circuit means responsive to said exposure signal to energize said flashlamp to emit said radiant energy for recording said image.

16. Apparatus as defined in claim 15, wherein said recording strip has a recording layer having image forming elements which undergo a change in properties when activated by radiant energy from said flashlamp in the regions of said strip extending between said boundary layer and the top of said zone of said container tube permitting processing of the recording layer to produce a record image from the changed image forming elements.

17. Apparatus as defined in claim 15, wherein said holder means includes masking means forming distinctive image patterns between said flashlamp and said strip on a region vertically spanning the test zone and aligned along ray paths from said flashlamp through the sample in said tube to cause occlusion of said patterns from the strip by the opaque portions of the sample and permit passage of said patterns to said strip only over the region above said boundary layer to form a record image indicating the location of the boundary layer.

18. Apparatus as defined in claim 15, wherein said recording strip has a recording layer which normally has a certain water permeability and which includes particles which are rendered less water permeable responsive to radiation from said flashlamp in the region thereof above the level of said boundary layer to provide a record image by the less water-permeable particles altered by said radiation which is rendered visible by washing the layer following exposure to leave only the less water-permeable particles thereon.

19. Apparatus as defined in claim 17, wherein said recording strip has a recording layer which normally has a certain water permeability and which includes particles which are rendered less water-permeable responsive to radiation from said flashlamp in the region thereof above the level of said boundary layer to provide a record image by the less water permeable particles altered by said radiation which is rendered visible by washing the layer following exposure to leave only the less water permeable particles thereon.

20. Apparatus as defined in claim 15, wherein said timing means include means for producing pulses and counter means for counting said pulses and producing said exposure signal upon attainment of a selected pulse count corresponding to said selected test period.

21. Apparatus as defined in claim 15, wherein said flashlamp includes a first pair of electrodes for arming the same and a third trigger electrode to fire the flashlamp, and said exposure circuit means includes means for developing a high-voltage charge in excess of several hundred volts to be applied across said first pair of electrodes of said flashlamp and includes a trigger circuit activated responsive to said exposure signal to apply a trigger voltage to said third electrode to fire the flashlamp.

22. Apparatus as defined in claim 20, wherein said means for producing pulses is an electronic pulse generator circuit for producing clock pulses at a selected uniform pulse repetition rate and said counter means comprises a series of counter circuits responsive to said clock pulses to produce said exposure signal upon counting a number of said clock pulses corresponding to the duration of an appropriate standing period for said sample to enable a boundary layer of opaque matter to form thereon appropriate for determination of the proportion of said opaque matter in said sample.

23. Apparatus as defined in claim 20, wherein said means for producing pulses is an electronic pulse generator circuit for producing clock pulses at a rate of one pulse per second responsive to a pulsating voltage derived from an alternating current supply voltage by counting the pulsations of said pulsating voltage in preselected relation to the number of cycles per second of said supply voltage and producing a clock pulse at the conclusion of each of said number of cycles, and said counter means comprises a series of counter circuits responsive to said clock pulses to produce said exposure signal upon counting a number of said clock pulses corresponding to the time duration of the selected test period following insertion of said container tube.

24. Apparatus as defined in claim 17, wherein said image patterns formed on said masking means are in the form of scale marks disposed between said strip and flash tube in alignment with radiant energy paths through said tube for casting image patterns on said strip in horizontal alignment with the portions of said test zone not occluded by sedimentation to thereby indicate the location of said boundary layer.

25. Apparatus as defined in claim 19, wherein said image patterns formed on said masking means are in the form of scale marks disposed between said strip and flash tube in alignment with radiant energy paths through said tube for casting image patterns on said strip in horizontal alignment with the portions of said test zone not occluded by sedimentation to thereby indicate the location of said boundary layer.

26. Apparatus as defined in claim 24, wherein a rigid slide member supported for vertical movement in said holder means forms a carrier for said scale marks, and said holder means includes an adjustment member bearing on said slide member for positioning said scale marks in proper horizontal alignment with said tube.

27. Apparatus as defined in claim 25, wherein a rigid slide member supported for vertical movement in said holder means forms a carrier for said scale marks, and said holder means includes an adjustment member bearing on said slide member for positioning said scale marks in proper horizontal alignment with said tube.

28. Apparatus as defined in claim 24, wherein said masking means further includes numbers spaced laterally in preselected alignment with said scale marks and displaced from the ray paths through the sample to cast on said strip images of said numbers along the whole height thereof.

29. Apparatus as defined in claim 25, wherein said masking means further includes numbers spaced laterally in preselected alignment with said scale marks and displaced from the ray paths through the sample to cast on said strip images of said numbers along the whole height thereof.

30. Apparatus for automatically timing and recording the sedimentation rate of plurally distinct samples of the same test fluid to provide information for a sequence-timed sedimentation rate curve of the test fluid, comprising a plurality of axially elongated light-transmissive sample container tubes for each holding a quantity of the same test fluid, a supporting station for each of the respective container tubes, plural radiant energy exposure devices and plural recording members paired therewith respectively associated with an associated one of the container tubes for recording an image indicating the location of the sedimentation boundary layer in the container tube associated therewith upon activation of the associated exposure device, a plurality of control circuit channels each associated with a respective one of said exposure devices, each control circuit channel having a source of pulses of selected sequence and pulse counting means for counting the pulses to produce an output signal after a selected pulse count cycle for activating the associated exposure device to cause recording of said image for the associated container tube, and sequencing means interconnecting said channels in a selected relationship relative to a first one of said channels for automatically activating each channel except such first channel to operate through its count cycle responsive to the output signal produced by the preceding channel in the sequence.

31. Apparatus as defined in claim 30 including switch means for each said channel for conditioning the selected channel to a first condition interconnecting the channels in said sequence relationship and a second condition rendering the associated channel independent of the remaining channels for cycling through its count cycle in individual association with insertion of a container tube in its associated supporting station.

32. Apparatus as defined in claim 30, wherein each said exposure device is a high-intensity flashlamp, and each recording member is a recording strip responsive to momentary energization of said flashlamp to record said image.

33. Apparatus as defined in claim 31, wherein said flashlamp includes a first pair of electrodes for arming the same and a third trigger electrode to fire the flashlamp, and said exposure circuit means includes means for developing a high-voltage charge in excess of several hundred volts to be applied across said first pair of electrodes of said flashlamp and includes a trigger circuit activated responsive to said exposure signal to apply a trigger voltage to said third electrode to fire the flashlamp.

34. Apparatus as defined in claim 30, wherein each said source of producing pulses is an electronic pulse generator circuit for producing clock pulses at a selected uniform pulse repetition rate and said counter means comprises a series of counter circuits responsive to said clock pulses to produce said exposure signal upon counting a number of said clock pulses corresponding to the duration of an appropriate standing period for the associated sample to enable a boundary layer of opaque matter to form therein appropriate for determination of the proportion of said opaque matter in said sample.